United States Patent Office 2,926,639
Patented Mar. 1, 1960

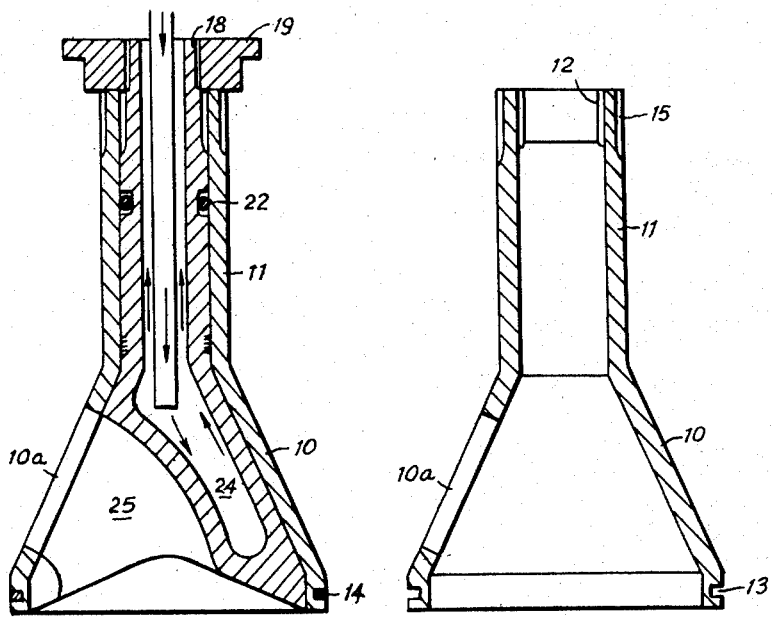
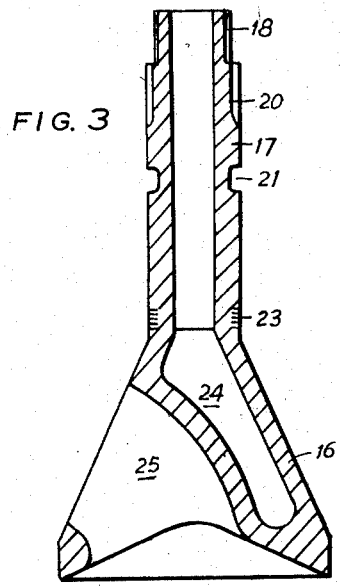

2,926,639

ROTARY VALVES FOR INTERNAL COMBUSTION ENGINES

Frank Metcalf Aspin, Alderley Edge, England, assignor of one-half to F. M. Aspin Engines Limited, Manchester, England, a British company Application June 3, 1957, Serial No. 663,038

Claims priority, application Great Britain June 6, 1956

3 Claims. (Cl. 123—41.4)

This invention relates to rotary valves for internal combustion engines of the kind comprising a conical head portion with combustion chamber formed therein and having a co-axial bearing stem. A rotary valve of such kind is described in British Patent No. 463,412.

In order to obtain the fullest possible control of combustion it is desirable to keep the combustion chamber as cool as possible. Also in order to obtain optimum conditions for the bearing surfaces of the valve and its seating, these should be kept as cool as possible.

The object of the present invention is an improved construction of rotary valve to obtain the aforesaid conditions.

According to the invention a rotary valve of the kind referred to is characterised in that it comprises an outer shell and an inner lining with intervening surfaces between the shell and lining whereby resistance is provided to heat conductivity at such surfaces.

The rotary valve aforesaid may be further characterised in that the outer shell and lining are of different materials; or further characterised in that the separating surfaces of the shell and lining are mutually contacting; or further characterised by means to reduce the heat conductivity between said intervening surfaces; or further characterised by an intervening material of low heat conductivity between the shell and lining; or further characterised in that the lining is made of high thermal conductivity material and adapted for internal cooling; or further characterised in that the shell is made of ferrous material such as cylinder iron for its bearing properties and rigidity and low thermal expansion.

In the accompanying drawings:

Fig. 1 is an axial section of one example of a rotary valve made in accordance with the present invention;

Figs. 2 and 3 show respectively the shell and the lining parts of the valve shown in Fig. 1.

As shown in the drawing the valve comprises an outer shell having a conical head 10 and bearing stem 11. The upper end of the stem is splined internally at 12 and the lower end of the cone is grooved at 13 for a sealing ring 14. In the shell is a lateral port 10a. The shell is made of cylinder iron and the stem is splined at its upper end at 15 for a driving pinion (not shown). The lining is made of aluminium alloy and has a complementary conical end 16 and stem 17. The upper end of the stem is screwed at 18 for an assembly nut 19 and has splines 20 complementary to the splines at 12 aforesaid in the shell. Below the splines is a groove 21 for a rubber or like O-ring 22 and at the lower end of the stem are a plurality of grooves forming a sealing labyrinth 23. The lining is hollow to provide a space 24 for coolant fluid, and is formed in the conical head with the combustion chamber 25.

By reason of the 2-part construction it is possible as above described to use a metal such as aluminium or copper, as a good thermal conductor in spite of its unsuitability in this instance as a bearing and therefore the combustion heat can be taken away quickly by the coolant fluid. At the same time, the mutual contacting surfaces between the shell and the lining provides resistance to the conduction of heat to the shell. The shell itself can be made of cylinder iron or other suitable material for a rotary valve and by providing resistance to heat conduction from the lining, the shell can be kept at a lower and better temperature for the bearing surfaces. In consequence also the shell is less liable to distortion.

In order further to reduce heat conductivity between the intervening surfaces, such surfaces may be suitably treated, or an intermediate material or liner of low heat conductivity may be provided between the shell and the inner lining for the same purpose.

The invention is obviously not limited to all the details above described which are only given by way of example.

I claim:

1. A rotary valve having a conical head and a co-axial bearing stem comprising an outer shell, a port in said head, a lining in said valve having complementary conical and stem portions, said lining and shell being secured together, said lining being hollow with means for introducing cooling fluid therein, the adjacent faces of said shell and lining providing resistance to heat conductivity.

2. A rotary valve having a conical head and a co-axial bearing stem comprising an outer shell, a port in said head, a lining in said valve having complementary conical and stem portions, said lining and shell being secured together, said lining being hollow with means for introducing cooling fluid therein, the adjacent faces of said shell and lining providing resistance to heat conductivity, and a combustion chamber between said port and said lining.

3. A rotary valve having a conical head and a co-axial bearing stem comprising an outer shell, a port in said head, a lining in said valve having complementary conical and stem portions, said lining and shell being secured together, said lining being hollow with means for introducing cooling fluid therein at the upper part of said lining stem, the adjacent faces of said shell and lining providing resistance to heat conductivity.

References Cited in the file of this patent

UNITED STATES PATENTS

| | | |
|---|---|---|
| 528,537 | Fryer | Nov. 6, 1894 |
| 921,264 | Mead | May 11, 1909 |
| 1,234,459 | Gody | July 24, 1917 |
| 1,799,759 | McDowell | Apr. 7, 1931 |